US005654056A

United States Patent [19]

Combe

[11] Patent Number: 5,654,056

[45] Date of Patent: Aug. 5, 1997

[54] PAINT MASK AND METHOD FOR MAKING SAME

[75] Inventor: G. Craig Combe, Port Franks, Canada

[73] Assignee: Intasco Corporation, Port Huron, Mich.

[21] Appl. No.: 320,492

[22] Filed: Oct. 7, 1994

[51] Int. Cl.[6] .......... C09J 7/02

[52] U.S. Cl. .......... 428/41.7; 428/41.8; 428/42.1

[58] Field of Search .......... 428/40, 43, 41, 428/40.1, 41.7, 41.8, 42.1; 156/248, 250, 268, 267

[56] References Cited

U.S. PATENT DOCUMENTS

| | | | |
|---|---|---|---|
| 2,574,152 | 11/1951 | Lewis et al. | 428/40 |
| 2,630,755 | 3/1953 | Herrin | 156/248 X |
| 3,457,137 | 7/1969 | McCarthy | 156/248 X |
| 3,810,812 | 5/1974 | Koenig | 156/248 X |
| 3,987,569 | 10/1976 | Chase | 40/158.1 |
| 4,032,679 | 6/1977 | Aoyagi | 428/41 |
| 4,317,852 | 3/1982 | Ogden | 428/41 |
| 4,430,137 | 2/1984 | Jones | 156/248 X |
| 4,505,770 | 3/1985 | Larimore | 428/41 |
| 5,078,670 | 1/1992 | Volkert | 156/248 X |

*Primary Examiner*—Jenna Davis
*Attorney, Agent, or Firm*—Bauer & Schaffer

[57] ABSTRACT

The paint mask comprises a first layer having an adhesive disposed on one surface thereof and a second layer removably affixed to the adhesive. A first die-cut penetrates the first layer and the adhesive layer, but not the second layer, for defining a predetermined design configuration. A second die-cut penetrates the second layer, but not the first layer and the adhesive, defining a preselected area of the second layer which is removable to expose a corresponding area of the adhesive for allowing the predetermined design configuration to be adhesively secured to a work surface to define the predetermined design configuration on the work surface.

1 Claim, 2 Drawing Sheets

Fig. 1
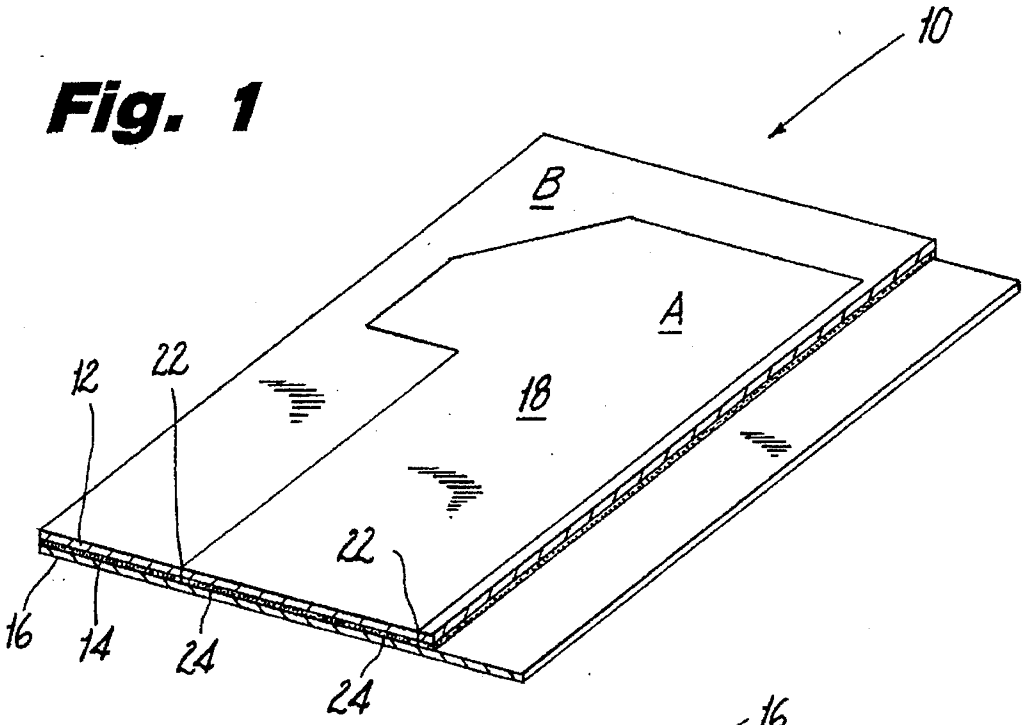
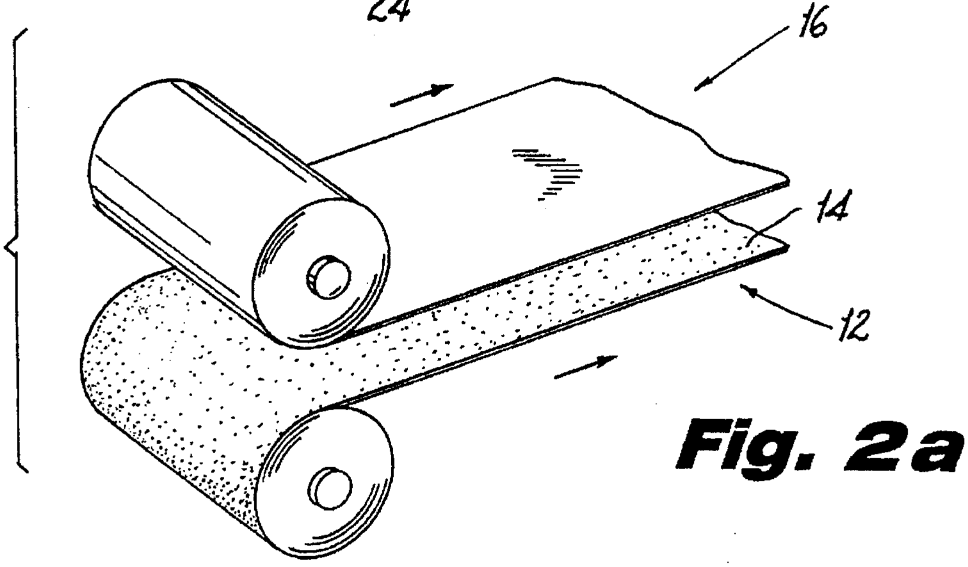
Fig. 2a
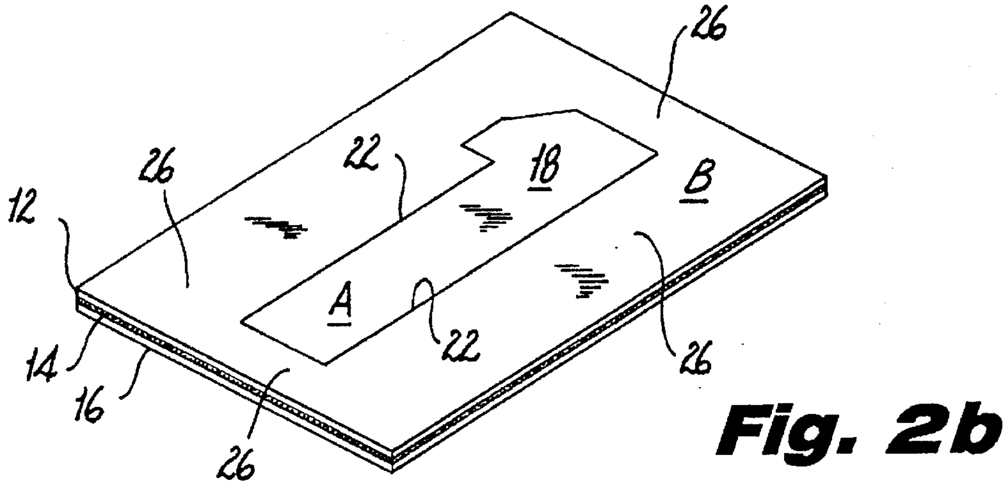
Fig. 2b

Fig. 2c
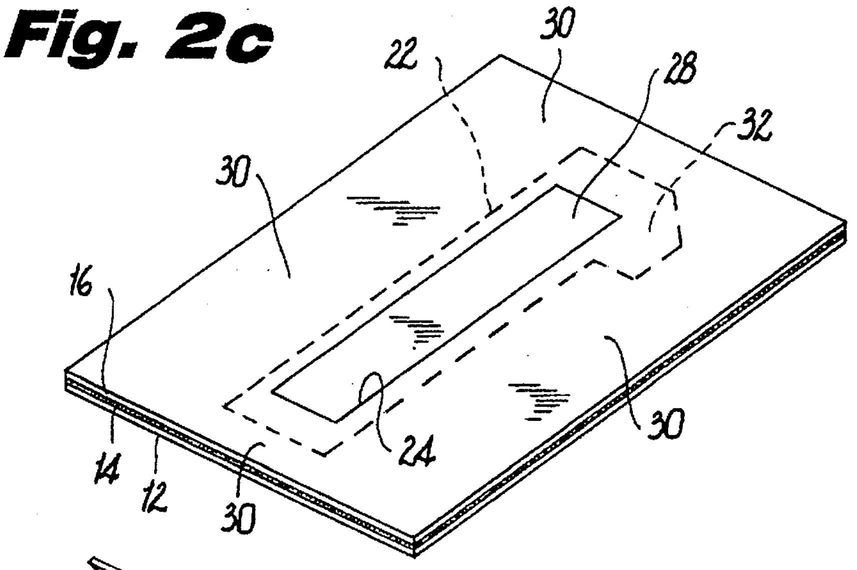
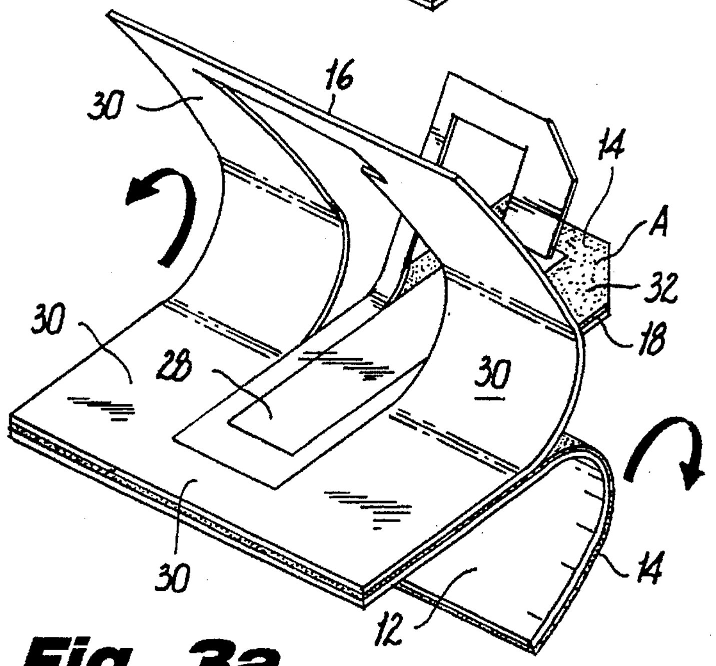
Fig. 3a
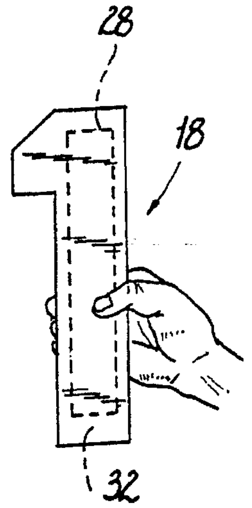
Fig. 3b
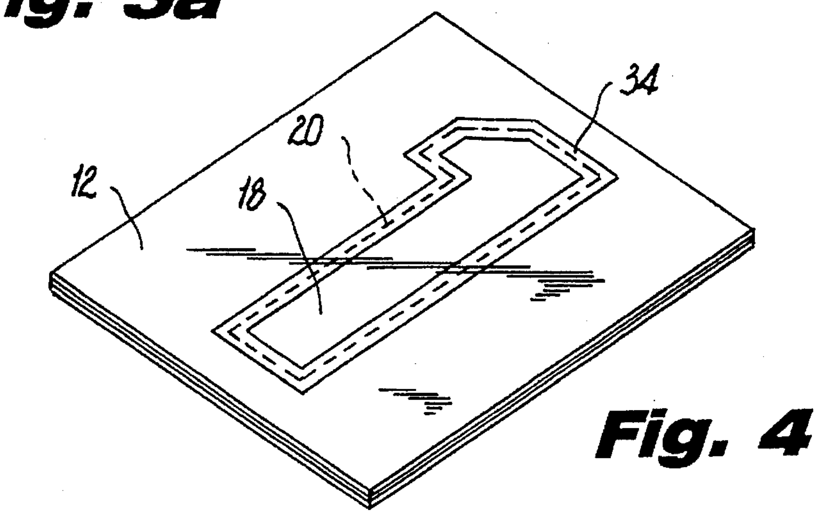
Fig. 4

PAINT MASK AND METHOD FOR MAKING SAME

This application contains subject matter and disclosure contained in disclosure document 357,872 filed Jul. 14, 1994.

FIELD OF THE INVENTION

The present invention relates to the construction of paint masks and, more particularly, to a laminate assembly formed with a removable mask for use in painting details of automobiles, boats and the like where the parts to be painted are of peculiar shape and curvature.

BACKGROUND OF THE INVENTION

Conventional application of masking tape or masking sheets (film or paper) to shaped and non-planar surfaces is difficult in that much cutting and shaping is required during the preparatory stages. Furthermore, the edges cannot be sharply cut so as to provide ultimately clear, sharp paint edges. This is of particular concern when painting successive vehicle bodies, all having the same shape and curvature.

Die-cut masks have been tried for masking sharply curved corners, conventional masking parts do not properly and effectively conform, before and after bending, shaping and folding, to the shape of the curved corner surface to which it is to be applied. Furthermore, such conventional masking parts are die cut in such a manner so as to render the masking part difficult to manipulate by the user after some or all of a protective liner has been peeled off and while the mask is being applied. Mishandling of the masking part can cause the mask to stick in the wrong place on the surface to be masked, or stick to the hands of the user, or even to itself, resulting in the masking part having to be discarded and a new one selected. This result in waste of time, labor and material.

In an attempt to resolve the above-mentioned problem, masking parts have been provided in which a series of die cuts are employed so that a number of masking parts are laid out. Such masking parts increase the time and labor in applying the mask on the working surface as well as sacrifice design and contour considerations.

In view of the above-mentioned shortcomings, it is an object of the present invention to provide a new and improved laminate assembly providing a die-cut paint mask which is simple in construction, easy to install highly effective in use, and readily adapted to a wide variety of masking applications and environments.

It is another object of the present invention to provide precut and formed paint masks which have been die-cut with precision.

It is yet another object of the present invention to provide a paint mask and method for its manufacture in which the edges are sharply cut so as to provide ultimately clear, sharp paint edges.

It is a further object of the present invention to provide a die-cut paint mask and method in which the outline of the die-cut mask is suitably designed and shaped to properly and effectively conform to the shape of the surface to which it is applied.

It is still another object of the present invention to provide a method of forming a paint mask and method which reduces the number of cutting and shaping steps required during preparatory stages.

The foregoing objects and advantages, as well as others, will be apparent from the following disclosure of the present invention.

SUMMARY OF THE INVENTION

In first aspect of the present invention, a laminate assembly is provided containing a mask adapted to be secured to a work surface. The laminate assembly comprises a substrate of a suitable masking material having an adhesive disposed on one surface thereof and a backing layer removably affixed to the adhesive. A mask having a predetermined configuration is formed on the substrate by incising the substrate producing a first cut line which penetrates the substrate and the adhesive layer, but not the backing layer. A second incision is made from the opposite side of the laminate to penetrate the backing layer, but not the first layer or the adhesive. The second incision lies within the area of the predetermined configuration of the mask.

In this manner, the laminate assembly is provided with the preconfigured mask cutout of the laminate which mask is easily removable from the backing layer. Simultaneously, the mask having an area on its back side in which the adhesive may be exposed, by removal of a portion of the backing layer, facilitates its adhesion to the work surface. Thus, during storage and transport the entire laminate is left safely intact while when placed in use the mask is easily, and safely, removed from the laminate and backing.

Preferably, the laminate assembly is made in roll form wherein a plurality of discrete masks are contained. It is, of course, possible to make each assembly in sheet form.

In certain instances, it may be desirable to employ a third layer, having an adhesive disposed on one surface thereof, secured about the marginal edge of the mask portion and the first die-cut line penetrates the third layer. The third layer is preferably made of a material such as a fine line tape which is capable of being sharply cut.

Full details of the present invention are set forth in the following disclosure and in the appended drawings.

BRIEF DESCRIPTION OF THE DRAWINGS

In the drawings:

FIG. 1 is a perspective view, partially cross-section, of a paint mask according to the present invention;

FIGS. 2A–2C illustrate the steps in forming the laminate assembly, FIG. 2A being a perspective view of the feeding of the substrate and backing members; FIG. 2B illustrating the incision of the top substrate to form the mask; and FIG. 2C the opposite side view showing the incision of the backing member.

FIGS. 3A and 3B illustrate the steps in preparing the laminate assembly to adhere the mask to the work surface; and FIG. 4 is a perspective view of a second laminate assembly.

DETAILED DESCRIPTION OF PREFERRED EMBODIMENTS

Referring now to the drawings, wherein like numerals are used to indicate like elements throughout, there is shown a laminate assembly including a mask particularly useful in the application of paint, lacquer or the like of predetermined design configuration to the surface of a complexedly curved workpiece such as to the body of an automobile, boat or the like. However, it will be understood by those skilled in the art that the invention has broader applications and may also be adapted to use in other environments.

The laminate assembly, generally depicted by the numeral 10, comprises a first thin, flexible substrate 12 having a contact type of adhesive coating 14 over the entirety of one surface thereof and a substantially coextensive backing layer 16 removably affixed over the adhesive 14. The substrate 12 may be selected from any of the conventional and commercially available products suitable as, and generally defined as, masking tapes. The term tape should not be limited to a type having a narrow width relative to length, but can be as wide as desired. The substrate may be constructed from a thin paper or paper-like material, such as a crepe paper, sheet, film or the like. The adhesive 14 is preferably an acrylic type adhesive or other conventional self-stick adhesive. The backing layer 16, preferably made of a paper or plastic material which includes a polyethylene coating, a silicon release coating, or the like on at least the surface thereof which contacts the adhesive coating 14 but does not permanently adhere thereto.

The substrate 12 is divided into two sections, the first section defining a mask 18 of specific shape and dimension as required by the ultimate painting operation. On the reverse side of the laminate assembly 10, the backing layer 16 is also divided into two sections, the first defining a back area 20 of selected shape within the confines of the mask 18. The sections of the substrate and backing layer not constituting the mask 18 or the area 20 will be later disposed of as waste. The mask area 18 is formed by incising the substrate along a continuous line 22 which passes through the substrate 12 and the adhesive coating 14. The back area 20 is formed by incising the backing layer 16 along a continuous line 24 which passes only through the backing layer 16.

The shape of the mask 18 is here illustrated as the number 1 for simplicity. The configuration of the mask will, of course, be defined by the nature of the painting required.

The preferred method of constructing the laminate assembly is illustrated in FIGS. 2A–2C. Here the substrate 12 with the coated adhesive 14 is fed in the form of a substantially endless roll by conventional feed or conveyor systems.

The substrate 12 is applied by its adhesive side to the backing layer 16, which is also in roll form, such that the entire width of the substrate is covered by the backing layer and thereafter squeezed or rolled into the laminate assembly (FIG. 2B). At the same time, the laminate is passed through a die cutter where the substrate 12 is cut along line 22 in accordance with the desired predetermined configuration of the mask 18. The die cut may be made using a roll die cutter or a platen die cutter, both of conventional construction. The incision 22 thus divides the surface of the substrate 12 into two sections, one section defining the predetermined mask 18 and the other section 26 defining an exterior matrix constituting those portions of the substrate not comprising the predetermined design configuration.

Thereafter, as seen in FIG. 2C, which shows the backing layer 16 on top, the incision along line 24 is made through the back side of the laminate assembly 12 specifically through the backing layer 16 without the cut lines passing through the adhesive 14 or into the first layer 12. The incision 24 is preferably made with a roll or platen die-cut, for example, so as to divide the backing layer into two sections, one section comprising a cover 28 for the back of the mask 18 and a second section 30 forming an exterior matrix. The incision 24 is placed within the confines of the mask area so that a marginal edge 32 of the mask 18 lies externally of the back cover 22.

Details of the conveyor system, the die cutters and other apparatus by which the laminate assembly is constructed and by which the incisions are made are omitted for the sake of convenience. Such apparatuses are conventional and are well known so that reference to commercial devices can be easily made as if more fully set forth herein.

In this manner, the aforementioned laminate assembly is packaged, stored and transported to the work site. Preparation of the laminate assembly for application of the mark 18 to the workpiece is illustrated in FIGS. 3A and 3B. As illustrated, the second matrix 30 of the backing layer 16 is first stripped from the laminate leaving the central back cover 28 adhering to the adhesive layer 14 of the substrate 12. With the stripping of the matrix 30 backing layer, the marginal area 32 of the mask 18, with its adhesive layer 14, is exposed. The laminate is then viewed from its top surface and the matrix 26 of substrate 12 (FIG. 2B) is then stripped from the mask 18 freeing the mask 18. As seen in FIG. 3B, the freed mask 18 is protected by cover 28 (dotted lines) on the back side while its marginal edge 32 with adhesive is exposed. Thus, accurate and secure placement on the work surface can be made simply by holding the device as seen in FIG. 3B.

After application of the mask, the work is then spray painted, roll painted, etc. Following painting, the mask is removed from cooperative association with the work surface leaving the resultant configuration of paint.

According to the second embodiment illustrated in FIG. 4, a third layer of fine line tape 34 is secured over the top surface of the substrate 12 about its marginal edge prior to making the incisions 20. The predetermined design configuration forming the mask 18 is then formed by passing the incision 20 through the fine line tape 34 as well as the substrate and adhesive edge and fine sharp die cut edge is made in the fine line tape. Otherwise, the structure and method of assembly and/or use remain the same.

The fine line tape may be selected from most conventional types of tape materials, including materials which are relatively inexpensive, to have a sharp, easily contoured edge and yet be relatively strong in use. This embodiment is preferably used for large mask areas where a masking tape, paper sheet or the like is employed which is thick and relatively cheap and thus cannot be die-cut with a clean sharp edge.

From the foregoing description, it can be seen that the present invention provides precut and preformed paint masks which can be die-cut with precision and in which the edges are sharply cut so as to provide ultimately clear, sharp paint edges. A die-cut paint mask and method is also provided in which the outline of the die-cut mask is suitably designed and shaped to properly and effectively conform to the shape of the surface to which it is applied. The paint mask and method of the present invention are simple in construction, easy to install highly effective in use, and readily adapted to a wide variety of masking applications and environments.

It will be appreciated by those skilled in the art, that changes could be made to the embodiments described in the foregoing description without departing from the broad inventive concept thereof. It is understood, therefore, that this invention is not limited to the particular embodiments disclosed, but is intended to cover all modifications which are within the scope and spirit of the invention as defined in the appended claims.

What is claimed is:

1. A mask adapted to be secured to a work surface for placing a predetermined design configuration thereon, said mask comprising:

a first masking layer having an adhesive disposed on one surface thereof;

a second layer substantially coextensive with said first layer, said second layer having a quick release backing removably affixed to said adhesive; and a third layer consisting of a fine line protective tape adhered to the other surface of said first layer at its marginal edges;

a first incision penetrating through said fine line tape, said first layer and said adhesive layer for defining a predetermined design configuration, wherein said first incision does not penetrate said second layer, the area of said first masking layer exterior of said design configuration being removable from said second layer to provide a continuous margin about said design without any adhesive, whereby said mask may be manually handled upon removal of the exterior layer;

a second incision penetrating said second layer for defining a preselected area within the bounds of said second layer, wherein said second incision does not penetrate said first layer and said adhesive, said preselected area being smaller than and wholly within said predetermined design configuration, the area of said second layer exterior of said preselected area being removable to expose a corresponding marginal area adhesive about said predetermined design configuration whereby upon removal of said exterior second layer said masking layer may be adhesively secured to a work surface and said fine line tape defines the predetermined design configuration on the work surface and provides a sharp masking edge about the predetermined design configuration.

* * * * *